US008954390B1

(12) United States Patent
Driscoll et al.

(10) Patent No.: US 8,954,390 B1
(45) Date of Patent: Feb. 10, 2015

(54) METHOD AND SYSTEM FOR REPLICATION IN STORAGE SYSTEMS

(75) Inventors: Alan Driscoll, Fremont, CA (US);
Devang Shah, San Jose, CA (US);
Balaji S. Rao, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 1065 days.

(21) Appl. No.: 12/432,648

(22) Filed: Apr. 29, 2009

(51) Int. Cl.
*G06F 17/30* (2006.01)

(52) U.S. Cl.
USPC .......................................... 707/638

(58) Field of Classification Search
CPC ................... G06F 17/30952; G06F 17/30643; G06F 17/30575
USPC ......... 707/634–635, 625, 633, 620, 626, 660, 707/665, 638
See application file for complete search history.

(56) References Cited

U.S. PATENT DOCUMENTS

| | | | |
|---|---|---|---|
| 5,649,200 A | 7/1997 | Leblang et al. | |
| 5,778,395 A | 7/1998 | Whiting et al. | |
| 6,574,591 B1 * | 6/2003 | Kleiman et al. | ...................... 1/1 |
| 6,604,118 B2 * | 8/2003 | Kleiman et al. | ...................... 1/1 |
| 7,185,027 B2 | 2/2007 | Gits et al. | |
| 7,290,003 B1 * | 10/2007 | Tong | ...................... 1/1 |
| 7,467,386 B2 | 12/2008 | Gallagher et al. | |
| 7,865,475 B1 * | 1/2011 | Yadav et al. | .................. 707/655 |
| 2003/0182330 A1 * | 9/2003 | Manley et al. | ................ 707/205 |
| 2004/0068523 A1 * | 4/2004 | Keith et al. | ..................... 707/200 |
| 2005/0193031 A1 * | 9/2005 | Midgley et al. | ............... 707/200 |
| 2006/0112150 A1 * | 5/2006 | Brown et al. | .................. 707/201 |
| 2006/0112151 A1 | 5/2006 | Manley et al. | |
| 2006/0184587 A1 * | 8/2006 | Federwisch et al. | .......... 707/200 |
| 2007/0156710 A1 * | 7/2007 | Kern et al. | ..................... 707/100 |
| 2007/0156791 A1 * | 7/2007 | Everhart | ....................... 707/204 |
| 2007/0226320 A1 | 9/2007 | Hager et al. | |
| 2008/0198488 A1 * | 8/2008 | Shimada et al. | ................ 360/15 |
| 2008/0270697 A1 * | 10/2008 | Ueoka et al. | ................... 711/114 |
| 2008/0306901 A1 * | 12/2008 | Chou et al. | ........................ 707/1 |

* cited by examiner

*Primary Examiner* — James Trujillo
*Assistant Examiner* — Fatima Mina
(74) *Attorney, Agent, or Firm* — Klein, O'Neill & Singh, LLP

(57) ABSTRACT

A data container replication method and system are provided. The data container includes a plurality of entries and is replicated from a source module to a destination module. The data container may be a directory that includes a plurality of files. Before replicating the directory, it is determined if the source module and the destination module use a same directory version and directory layout. If the directory version and layout are the same, then the entire directory is replicated "as is" without evaluating every directory entry. If the directory version or the directory layout is different, then each directory entry is evaluated, before being replicated.

33 Claims, 6 Drawing Sheets

| File ($F_1$) | File ($F_2$) | ....... | File ($F_n$) |
|---|---|---|---|
| 414 | 414 | | 414 |
| $Id_{F1}$ 412 | $Id_{F2}$ 412 | | $Id_{Fn}$ 412 |

Directory Version

| $O_1$ | $O_2$ | ....... | $O_n$ |
|---|---|---|---|

| Name | File Identifier | File Generation Number |
|---|---|---|
| 504 | 506 | 508 |

METHOD AND SYSTEM FOR REPLICATION IN STORAGE SYSTEMS

1. TECHNICAL FIELD

The present disclosure relates to storage systems.

2. RELATED ART

A storage system typically comprises one or more storage devices where information may be stored and from where information may be retrieved, as desired. The storage system may be implemented in accordance with a variety of storage architectures including, but not limited to, a network-attached storage (NAS) environment, a storage area network (SAN) and a disk assembly directly attached to a client or host computer.

The storage system typically includes a storage operating system that may implement a high-level module, such as a file system, to logically organize information stored at storage volumes as a hierarchical structure of data containers, such as files and logical units. For example, stored files may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system.

Typically, the file system also maintains a directory structure for managing stored files. The directory may include various entries for identifying files and other information.

For redundancy and disaster recovery, storage information, including directory information, is commonly replicated. Typically, information is replicated from one logical storage volume (referred to as source volume) to another logical storage volume (referred to as destination volume) for redundancy. Most storage systems maintain replication policies and procedures for replicating stored information, including directories, for example, "back up" procedures.

Conventional techniques for replicating data containers, for example, directory files are inefficient. One common way to replicate directories is to evaluate each directory entry, translate each directory entry from a directory version used by the source volume to a version used by a replication protocol and then to a version used by the destination volume. Each entry is then replicated in the version used by the destination volume. Evaluating and parsing through multiple directory entries can be time consuming and utilize computing resources. Continuous efforts are being made to efficiently replicate data containers in general and directories in particular.

SUMMARY

In one embodiment, an adaptive, data container, replication method and system are provided. The data container includes a plurality of entries and is replicated from a source module to a destination module. In one example, the data container is a directory and includes a plurality of files.

Before replicating the directory, it is determined if the source module and the destination module use a same directory version and a same directory layout. If the directory version and layout are the same, then the entire directory is replicated "as is" without evaluating every directory entry. If the directory version or the directory layout is different, then each directory entry is evaluated, before being replicated.

The adaptive embodiments disclosed herein have various advantages. For example, when directory versions and layouts are the same, then individual directory entries are not evaluated. This saves time and computing resources.

In another embodiment, a machine implemented method for replicating a data container having a plurality of entries, from a source module to a destination module is provided. The method includes: (a) determining if the source module and the destination module use a same directory version for storing information for the data container; (b) determining if the source module and the destination module use a same layout for storing information for the data container; and (c) if the source module and the destination module use the same directory version and the same layout for storing information for the data container, replicating the data container from the source module to the destination module without evaluating every entry within the data container.

In yet another embodiment, a machine readable storage medium storing executable instructions, which when executed by a machine, causes the machine to perform a process for replicating a data container having a plurality of entries, from a source module to a destination module is provided. The process steps include determining if the source module and the destination module use a same directory version for storing information for the data container; determining if the source module and the destination module use a same layout for storing information for the data container; and if the source module and the destination module use the same directory version and the same layout for storing information for the data container, replicating the data container from the source module to the destination module without evaluating every entry within the data container.

In another embodiment, a computer program product is provided. The product includes a computer usable storage medium having computer readable instructions embodied therein for replicating a data container having a plurality of entries, from a source module to a destination module. The computer readable instructions include: (a) instructions for determining if the source module and the destination module use a same directory version for storing information for the data container; (b) instructions for determining if the source module and the destination module use a same layout for storing information for the data container; and (c) instructions for replicating the data container from the source module to the destination module without evaluating every entry within the data container, if the source module and the destination module use the same directory version and the same layout for storing information for the data container.

In one embodiment, a machine implemented method for replicating a data container having a plurality of entries, from a source module to a destination module. The method includes: determining if the source module and the destination module use a same directory version for storing information for the data container; determining if the source module and the destination module use a same layout for storing information for the data container; and if the source module and the destination module use the same directory version and the same layout for storing information for the data container, replicating the data container from the source module to the destination module without evaluating every entry within the data container.

If the source module and the destination module use a different directory version or a different layout for storing information for the data container, (i) evaluating each entry within the data container; and (ii) before replicating the plurality of entries of the data container, translating each entry from a version used by the source module to a version used by a network protocol and then to a version used by the destination module.

In another embodiment, a machine readable storage medium storing executable instructions, which when executed by a machine, causes the machine to perform a process for replicating a data container having a plurality of entries, from a source module to a destination module is provided. The method includes: determining if the source module and the destination module use a same directory version for storing information for the data container; determining if the source module and the destination module use a same layout for storing information for the data container; and if the source module and the destination module use the same directory version and the same layout for storing information for the data container, replicating the data container from the source module to the destination module without evaluating every entry within the data container.

If the source module and the destination module use a different directory version or a different layout for storing information for the data container, (i) evaluating each entry within the data container; and (ii) before replicating the plurality of entries of the data container, translating each entry from a version used by the source module to a version used by a network protocol and then to a version used by the destination module.

In yet another embodiment, a computer program product is provided. The product include a computer usable storage medium having computer readable instructions embodied therein for replicating a data container having a plurality of entries, from a source module to a destination module.

The computer readable instructions include: instructions for determining if the source module and the destination module use a same directory version for storing information for the data container; instructions for determining if the source module and the destination module use a same layout for storing information for the data container; and instructions for replicating the data container from the source module to the destination module without evaluating every entry within the data container, if the source module and the destination module use the same directory version and the same layout for storing information for the data container.

If the source module and the destination module use a different directory version or a different layout for storing information for the data container, the computer program product includes instructions for (i) evaluating each entry within the data container; and (ii) before replicating the plurality of entries of the data container, translating each entry from a version used by the source module to a version used by a network protocol and then to a version used by the destination module.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 4B shows an example of directory entries that are replicated, according to one embodiment;

FIG. 5A shows a generic example of a directory version;

FIG. 5B shows an example of fields for defining a directory version;

DETAILED DESCRIPTION

Figure 1:
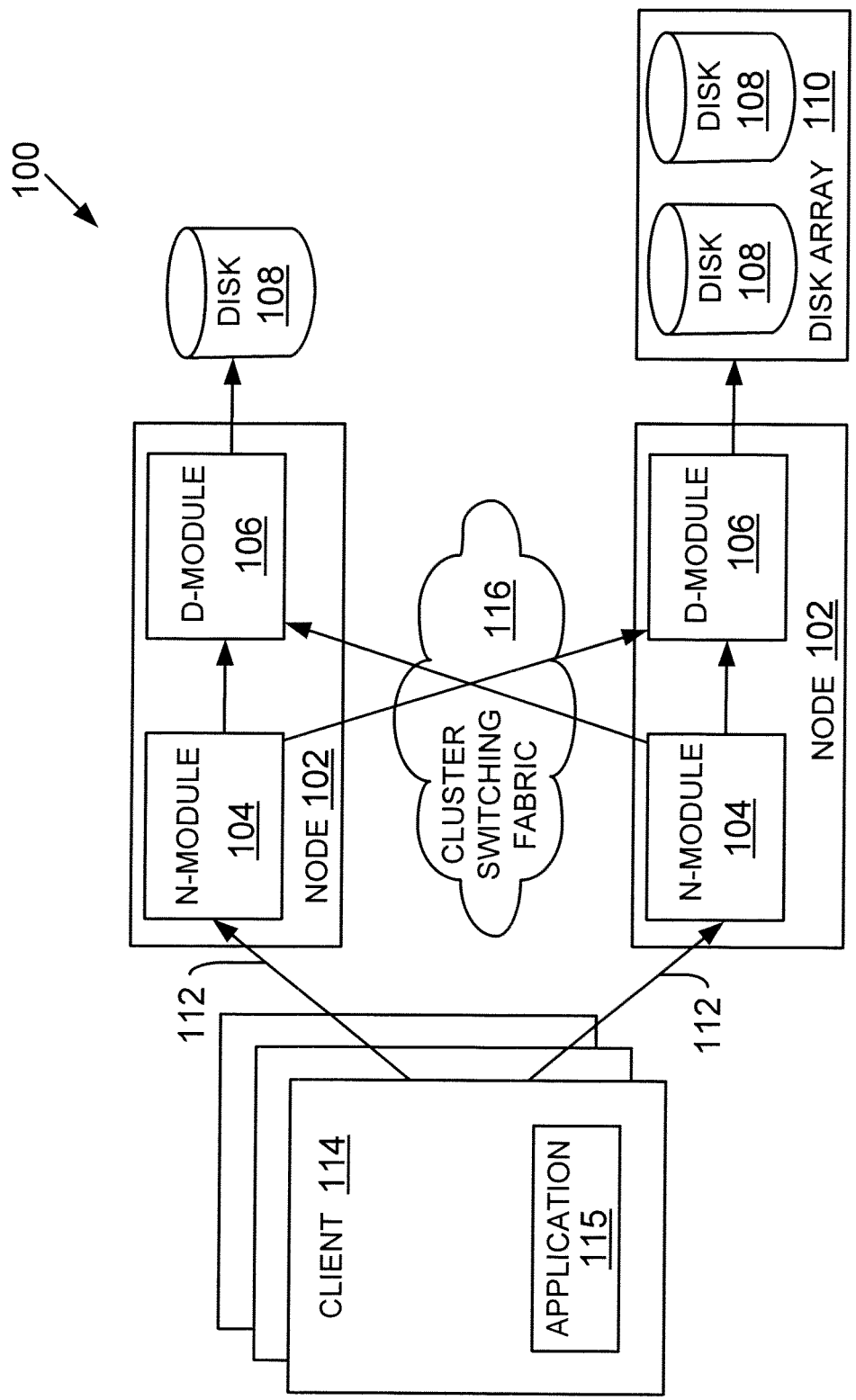
FIG. 1 shows a block diagram of a clustered system using the methodology of the present disclosure.

The following definitions are provided as they are typically (but not exclusively) used in the computing/storage environment, implementing the various adaptive embodiments described herein.

"Data Container" means a file, a logical unit or any other information. The term file is used interchangeably with data container, throughout this specification.

"Replication" means copying data containers, including directories, from one logical storage volume (e.g. source volume) to another logical storage volume (e.g. destination volume).

In one embodiment, an adaptive data container, replication method and system are provided. The data container includes a plurality of entries and is replicated from a source module to a destination module. In one example, the data container is a directory and includes a plurality of files.

Before replicating the directory, it is determined if the source module and the destination module use a same directory version and a directory layout. If the directory version and layout are the same, then the entire directory is replicated "as is" without evaluating every directory entry. If the directory version or the directory layout is different, then each directory entry is evaluated, before being replicated.

To facilitate an understanding of the various embodiments of the present disclosure, the general architecture and operation of a networked, clustered storage system will first be described. The specific architecture and operation of the various embodiments will then be described with reference to the general architecture.

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Clustered System:

FIG. 1 is a schematic block diagram of a plurality of nodes 102 interconnected as a cluster 100 and configured to provide storage services related to organization of information on storage devices. Nodes 102 comprise various functional components that cooperate to provide distributed storage system architecture of cluster 100. Each node 102 is generally organized as a network element (N-module 104) and a disk element (D-module 106). The N-module 104 includes functionality that enables node 102 to connect to clients 114 over a computer network 112, while each D-module 106 connects to one or more storage devices, such as disks 108 or a disk array 110.

Nodes 102 may be interconnected by a cluster switching fabric 116 which, in the illustrative embodiment, may be embodied as a Gigabit Ethernet switch. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Clients 114 may be general-purpose computers configured to interact with the node 102 in accordance with a client/server model of information delivery. That is, each client 114 may request the services of the node 102, and the node 102 may return the results of the services requested by the client 114, by exchanging packets over the network 112. The client 114 may issue packets using application 115 including file-based access protocols, such as the Common Internet File System (CIFS) protocol or Network File System (NFS) protocol, over the Transmission Control Protocol/Internet Protocol (TCP/IP) when accessing information in the form of certain data containers, such as files and directories. Alternatively, the client 114 may issue packets using application 115 including block-based access protocols, such as the Small Computer Systems Interface (SCSI) protocol encapsulated over TCP (iSCSI) and SCSI encapsulated over Fibre Channel (FCP), when accessing information in the form of other data containers, such as blocks.

Figure 2:
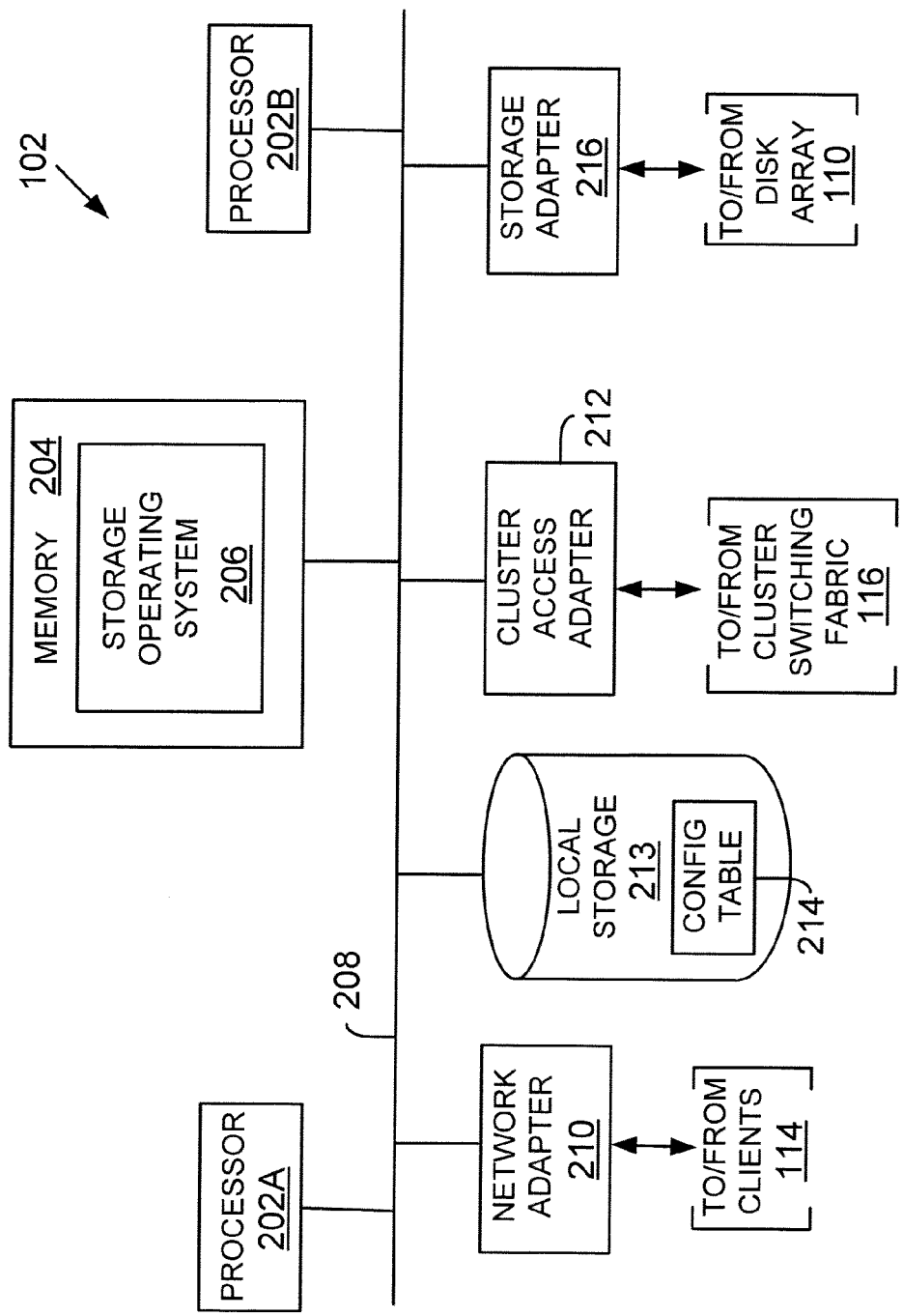
FIG. 2 shows an example of a node used by the system of FIG. 1.

Storage System Node:

FIG. 2 is a block diagram of a node 102 that is illustratively embodied as a storage system comprising of a plurality of processors 202A and 202B, a memory 204, a network adapter 210, a cluster access adapter 212, a storage adapter 216 and local storage 213 interconnected by a system bus 208. The local storage 213 comprises one or more storage devices, such as disks, utilized by the node to locally store configuration information (e.g., in a configuration table 214).

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on disks 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing software program code and data structures. The processor and adapters may, in turn, comprise processing elements and/or logic circuitry configured to execute the software code and manipulate the data structures. It will be apparent to those skilled in the art that other processing and memory means, including various computer readable media, may be used for storing and executing program instructions pertaining to the invention described herein.

The storage operating system 206, portions of which is typically resident in memory and executed by the processing elements, functionally organizes the node 102 by, inter alia, invoking storage operations in support of the storage service implemented by the node. An example of operating system 206 is the DATA ONTAP® (Registered trademark of NetApp, Inc.) operating system available from NetApp, Inc. that implements a Write Anywhere File Layout (WAFL® (Registered trademark of NetApp Inc.) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Illustratively, the computer network 112 may be embodied as an Ethernet network or a Fibre Channel (FC) network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 108 of array 110. The storage adapter 216 comprises a plurality of ports having input/output (I/O) interface circuitry that couples to the disks over an I/O interconnect arrangement, such as a conventional high-performance, FC link topology.

Storage of information on each array 110 is preferably implemented as one or more storage "volumes" that comprise a collection of physical storage disks 108 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 3:
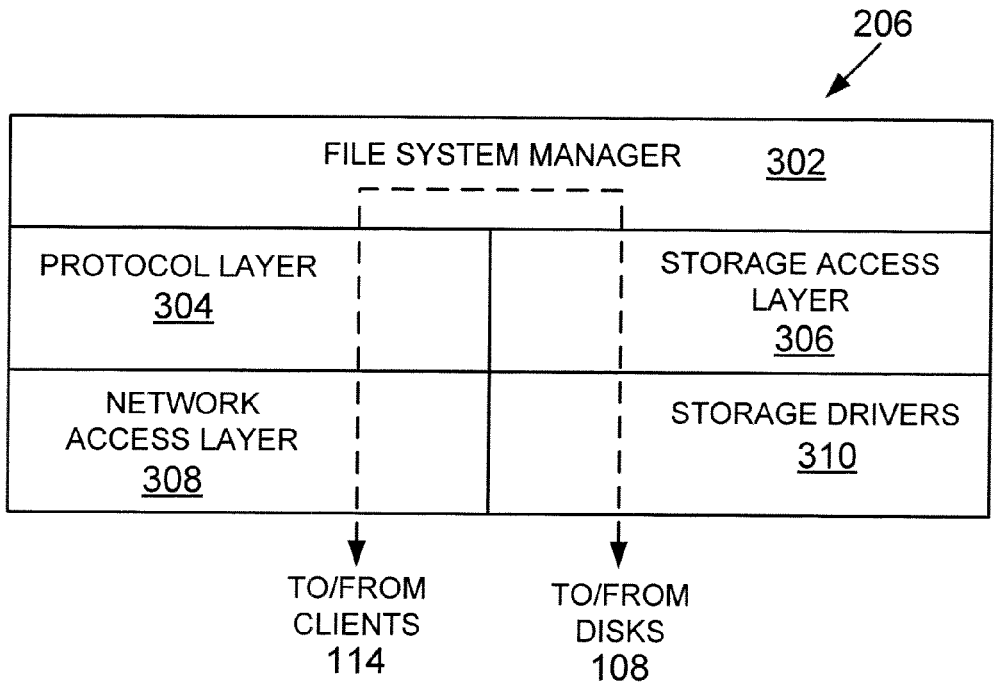
FIG. 3 shows an example of an operating system used according to one embodiment.

Operating System:

FIG. 3 illustrates a generic example of operating system 206 executed by node 102, according to one embodiment of the present disclosure. In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e. executes read/write operations on disks in response to client 114 requests.

Operating system 206 may also include a protocol layer 304 and an associated network access layer 308, to allow node 102 to communicate over a network with other systems, such as clients 114. Protocol layer 304 may implement one or more of various higher-level network protocols, such as Network File System (NFS), Common Internet File System (CIFS), Hypertext Transfer Protocol (HTTP), Transmission Control Protocol/Internet Protocol (TCP/IP) and others.

Network access layer 308 may include one or more drivers, which implement one or more lower-level protocols to communicate over the network, such as Ethernet. Interactions between clients 114 and mass storage devices 108 (e.g. disks, etc.) are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as Fibre Channel Protocol (FCP) or SCSI. In one embodiment, the storage access layer 306 may implement a RAID protocol, such as RAID-4 or RAID-DP™ (RAID double parity for data protection provided by NetApp, Inc., the assignee of the present disclosure).

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an application specific integrated circuit (ASIC). This type of hardware implementation increases the performance of the file service provided by node 102 in response to a file system request issued by client 114.

In one embodiment, file system manager 302 may be a Write Anywhere File System (WAFL) layer. The WAFL based file system is block-based, i.e. stores information on disks as blocks, for example, using, e.g., 4 kilobyte (KB) data blocks, and uses modes to describe the files. An inode is a data structure, e.g., a 128-byte structure, which may be used to store information, such as meta-data, about a file. The meta-data may include data information, e.g., ownership of the file, access permission for the file, size of the file, file type and location of the file on disk, as described below. The WAFL layer uses a file handle, i.e., an identifier that includes an inode number, to retrieve an inode from a storage disk. The WAFL layer also uses files to store meta-data describing the layout of its file system. These meta-data files include, among others, an mode file.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4A:
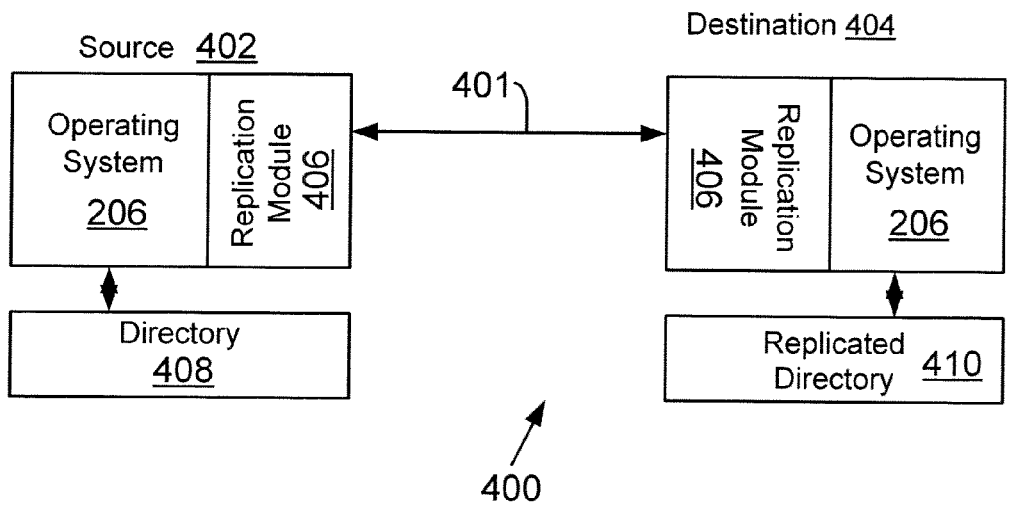
FIG. 4A shows an example of directory replication, according to one embodiment.

Replication System:

FIG. 4A shows an example of a replication system 400, according to one embodiment. System 400 includes a source node (or source module) 402 (also referred to as "source 402" or "node 402") and a destination node (or destination module) 404 (also referred to as "destination 404" or "node 404"), similar to node 102, described above with respect to FIGS. 1-3. Each node executes a replication module 406 to replicate data containers, for example, directory 408.

In one embodiment, replication module 406 may be a standalone module or an integrated with operating system 206. Replication module 406 may be executed by a processor (for example, 202A) out of memory 204 (FIG. 2).

Source node 402 communicates with destination node 404 via a replication protocol 401. An example of a replication protocol is the SpinNP protocols available from NetApp Inc or the commonly used Network Data Management Protocol (NDMP).

Using replication protocol 401, source node 402 and destination node 404 exchange information. This allows source node 402 to replicate directory 408 and store directory 408 as replicated directory 410.

Source node 402 and destination node 404 may use different directory versions and directory layouts for storing directory information. An example of directory version and directory layout is now provided with respect to FIGS. 4B, 5A-5B and 6A-6B, respectively.

FIG. 4B shows an example of directory 408. Directory 408 may include a plurality of entries, 414, for example, files, F1 to Fn. Each file has a unique identifier 412. For example, File F1 is identified as IDf1, file F2 as IDf2 and so forth.

FIG. 5A shows an example of defining a directory version 500 for storing directory 408. Directory version 500 includes a plurality of objects, O1 to On (502). Each object has certain properties and values as described below with respect to FIG. 5B. When source node 402 and destination node 404 use the same directory version then objects 502 have the same properties and values. An example of directory version 500 is also provided in FIG. 5B.

In FIG. 5B, directory version 500 includes a directory name 504, a file identifier 506 and a file generation number 508. When source node 402 and destination node 404 use the same file name, file identifiers and file generation number, then both nodes use the same directory version. It is noteworthy, that the adaptive aspects are not limited to any particular parameter/entry to determine if same directory versions are being used.

It is noteworthy that the foregoing example of directory version 500 is only used to illustrate some of the fields that may be used to define a directory version. Directory version 500 may also include other directory attributes, for example, a number of directory entries within a data block, the size of a single directory data block, the layout space for file names within a directory and others.

Figure 6A:
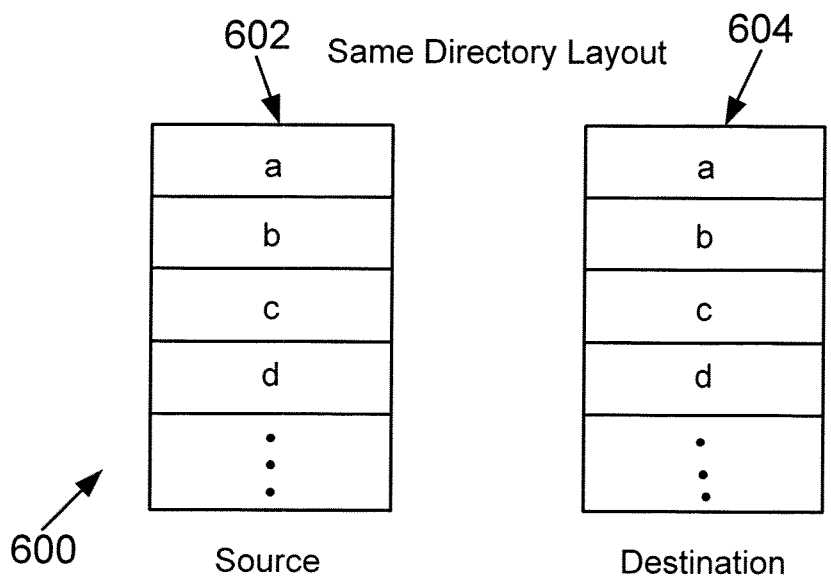
FIG. 6A shows an example of a same directory layout.

Nodes 402 and 404 of FIG. 4A also use a directory layout to manage information. Directory layout in this context means the order in which files may be arranged within a directory. FIG. 6A shows an example of a same directory layout 600. This means that source node 402 and destination node 404 substantially use the same directory layout. Column 602 shows a layout with names of directory entries (or keys that identify directory entries), for example, a, b, c and d at source node 402. Column 604 shows the same order for the names of directory entries at destination node 404.

Figure 6B:
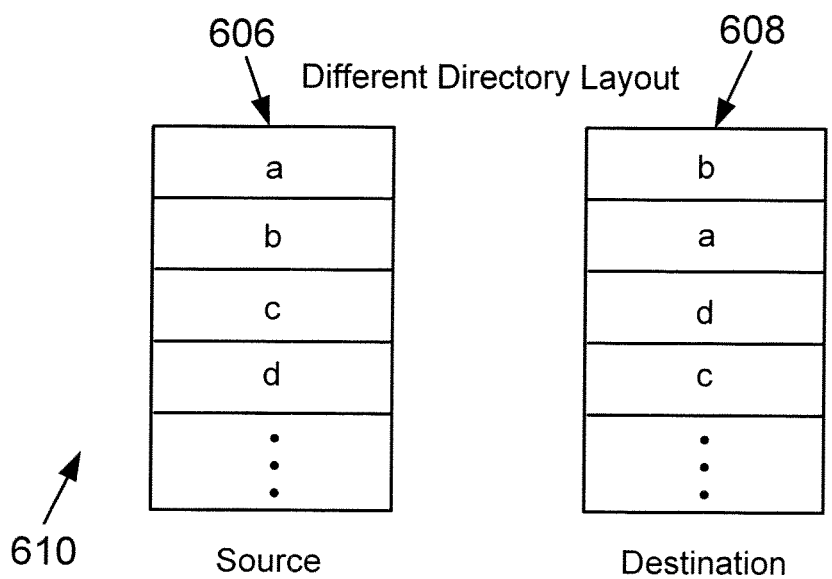
FIG. 6B shows an example of a different direct layout.

A different directory layout 610 is shown in FIG. 6B. In this example, while the source column 606 stores the names of the directory entries in the order, a, b, c and d, the destination node 404 as shown in column 608, stores the names of the directory entries in the order b, a, d and c. Based on columns 606 and 608, source node 402 and destination node 404 use different directory layouts.

Figure 7:
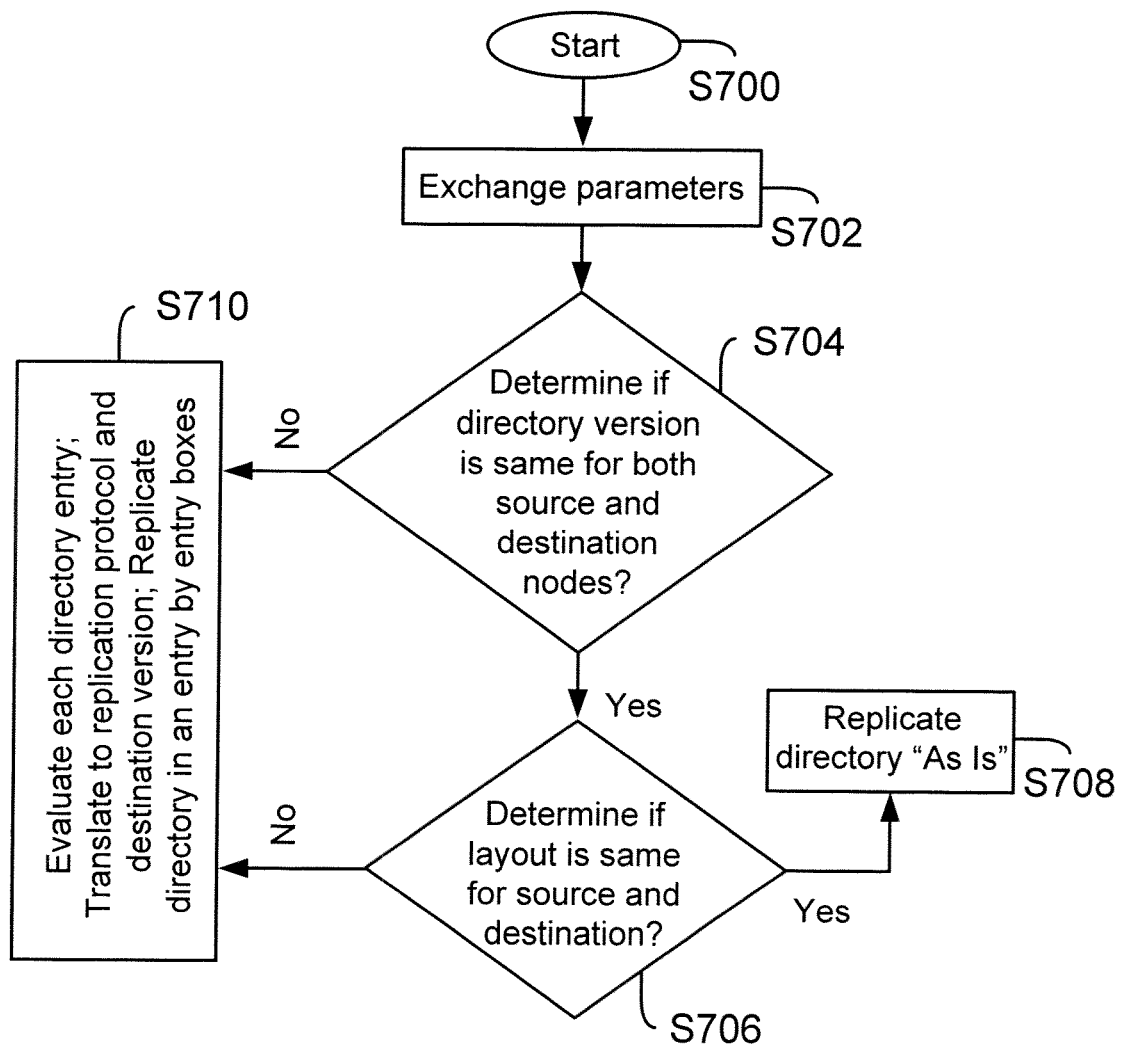
FIG. 7 shows a process flow diagram for replicating data containers, according to one embodiment.

Process Flow:

FIG. 7 shows an adaptive process for replicating directory 408 and storing it as directory 410. The process begins in block S700. In block S702, source node 402 and destination node 404 exchange data container parameters via replication protocol 401. In one example, replication module 406 executed out of memory by a processor at both the nodes exchange data container parameters. In one embodiment, source node 402 and destination node 404 exchange directory versions and directory layout information, before a directory is replicated. The directory version and layout information may be stored at a memory location (for example, configuration table 214) that is accessible to both the replication module 406 and the operating system 206.

In block S704, before directory 408 is replicated, replication module 406, executed by a processor out of memory, determines if the directory version is same for both the source node 402 and the destination node 404. Replication module 406 may scan configuration table 214 to determine if the directory version is the same.

If the directory versions are the same, the process moves to block S706. If the directory versions are different, then the process moves to block S710, described below.

In block S706, replication module 406, executed by a processor out of memory, determines if the directory layout for both source node 402 and destination node 404 is the same. Replication module 406 may scan configuration table 214 to determine if the directory layout is the same. If the layouts are different, then the process moves to block S710.

In block S710, each directory entry is evaluated, translated to the version used by the replication protocol (401, FIG. 4A) and then translated to a version used by the destination node. Each entry is then replicated and stored as replicated directory 410 at a destination storage volume. Replication module 406, executed at the source node 402, performs the operations in block S710.

If the layout in block S706 is the same, then in block S708, directory 408 is replicated "As Is", without evaluating every entry in directory 408. The replicated directory is stored as replicated directory 410 at a destination storage volume.

The adaptive embodiments described herein have various advantages. For example, in directory replication, when directory versions and layouts are the same, then individual directory entries are not evaluated. This saves time and computing resources.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for replicating a directory having a plurality of entries, comprising:

determining prior to replicating the directory from a logical source volume to a logical destination volume that a source module and a destination module use a same directory version by exchanging directory version information between the source module and the destination module via a replication protocol; wherein the source module and the destination module use the same directory version when object properties defining a directory version of the source module and the destination module are the same;

determining that the source module and the destination module use a same layout for storing the plurality of entries, if the source module and the destination module use the same directory version for storing the plurality of entries; wherein the same layout is defined by an order in which each of the plurality of entries are stored by the source module and the destination module;

replicating the directory from the source module to the destination module without evaluating and translating the plurality of entries from a version used by the source module to a version used by the destination module, when the source module and the destination module use the same directory version and the same layout for storing the plurality of entries; and evaluating each of the plurality of entries, when the source module and the destination module use a different directory version or a different layout; and before replicating the plurality of entries translating each entry from the version used by the source module to a version used by a replication protocol, and then to the version used by the destination module.

2. The machine implemented method of claim 1, wherein the directory is a file directory having a directory name and storing a unique file identifier for each file within the file directory.

3. The machine implemented method of claim 2, wherein the directory name and the unique file identifier define the version for the directory as used by the source module and the destination module.

4. A non-transitory, machine readable storage medium having stored thereon instructions for performing a method for replicating a directory having a plurality of entries, comprising machine executable code which when executed by at least one machine, causes the machine to:
- determine prior to replicating the directory from a logical source volume to a logical destination volume that a source module and a destination module use a same directory version by exchanging directory version information between the source module and the destination module via a replication protocol; wherein the source module and the destination module use the same directory version when object properties defining a directory version of the source module and the destination module are the same;
- determine that the source module and the destination module use a same layout for storing the plurality of entries, if the source module and the destination module use the same directory version for storing the plurality of entries; wherein the same layout is defined by an order in which each of the plurality of entries are stored by the source module and the destination module;
- replicate the directory from the source module to the destination module without evaluating and translating the plurality of entries from a version used by the source module to a version used by the destination module, when the source module and the destination module use the same directory version and the same layout for storing the plurality of entries; and
- evaluate each of the plurality of entries, when the source module and the destination module use a different directory version or a different layout; and before replicating the plurality of entries, translate each entry from the version used by the source module to a version used by a replication protocol, and then to the version used by the destination module.

5. The machine readable storage medium of claim 4, wherein the directory is a file directory having a directory name and storing a unique file identifier for each file within the file directory.

6. The machine readable storage medium of claim 5, wherein the directory name and the unique file identifier define the version for the directory as used by the source module and the destination module.

7. A system, comprising:
a memory having machine readable medium comprising machine executable code having instructions stored thereon; and a processor module coupled to the memory configured to execute the machine executable code to:
- determine prior to replicating the directory from a logical source volume to a logical destination volume that a source module and a destination module use a same directory version by exchanging directory version information between the source module and the destination module via a replication protocol; wherein the source module and the destination module use the same directory version when object properties defining a directory version of the source module and the destination module are the same;
- determine that the source module and the destination module use a same layout for storing the plurality of entries, if the source module and the destination module use the same directory version for storing the plurality of entries; wherein the same layout is defined by an order in which each of the plurality of entries are stored by the source module and the destination module;
- replicate the directory from the source module to the destination module without evaluating and translating the plurality of entries from a version used by the source module to a version used by the destination module, when the source module and the destination module use the same directory version and the same layout for storing the plurality of entries; and
- evaluate each of the plurality of entries, when the source module and the destination module use a different directory version or a different layout; and before replicating the plurality of entries, translate each entry from the version used by the source module to a version used by a replication protocol, and then to the version used by the destination module.

8. The system of claim 7, wherein the directory is a file directory having a directory name and storing a unique file identifier for each file within the file directory.

9. The system of claim 8, wherein the directory name and the unique file identifier define the version for the directory as used by the source module and the destination module.

10. A machine implemented method for replicating a directory having a plurality of entries, comprising:
- exchanging information via a replication protocol regarding a directory version of the directory between a source module and a destination module;
- determining that the source module and the destination module use a same layout in the directory for storing the plurality of entries, when the source module and the destination module use a same directory version for storing the plurality of entries; wherein the same layout is defined by an order in which each of the plurality of entries are stored by the source module and the destination module; and
- replicating the directory from the source module to the destination module without evaluating and translating the plurality of entries from a version used by the source module to a version used by replication protocol and a version used by the destination module, when the source module and the destination module use a same directory version and the same layout for storing the plurality of entries.

11. The machine implemented method of claim 10, further comprising:
evaluating each entry within the directory when the source module and the destination module use a different directory version for storing information for the directory; and before replicating the plurality of entries of the directory, translating each entry from the version used by the source module to the version used by the replication protocol and the version used by the destination module.

12. The machine implemented method of claim 10, further comprising:
evaluating each entry within the directory when the source module and the destination module use a different layout for storing the plurality of entries; and before replicating the plurality of entries of the directory, translating each entry from the version used by the source module to the version used by the replication protocol and the version used by the destination module.

13. The machine implemented method of claim 10, wherein the directory includes a file directory having a directory name and storing a unique file identifier for each file within the file directory.

14. The machine implemented method of claim 13, wherein the directory name and the unique file identifier define the version for the directory as used by the source module and the destination module.

15. The machine implemented method of claim 13, wherein the directory is replicated from a logical storage volume maintained by the source module to a logical storage volume maintained by the destination module.

16. The machine implemented method of claim 10, wherein the source module executes an operating system for maintaining the plurality of entries in the directory.

17. The machine implemented method of claim 10, wherein the destination module executes an operating system for maintaining the plurality of entries in the replicated directory.

18. A non-transitory, machine readable storage medium having stored thereon instructions for performing a method for replicating a directory having a plurality of entries, comprising machine executable code which when executed by at least one machine, causes the machine to:
    exchange information via a replication protocol regarding a directory version of the directory between a source module and a destination module;
    determine that the source module and the destination module use a same layout in the directory for storing the plurality of entries, when the source module and the destination module use a same directory version for storing the plurality of entries; wherein the same layout is defined by an order in which each of the plurality of entries are stored by the source module and the destination module; and
    replicate the directory from the source module to the destination module without evaluating and translating the plurality of entries from a version used by the source module to a version used by replication protocol and a version used by the destination module, when the source module and the destination module use a same directory version and the same layout for storing the plurality of entries.

19. The storage medium of claim 18, the machine executable code further causes the machine to:
    evaluate each entry within the directory when the source module and the destination module use a different directory version for storing information for the directory; and before replicating the plurality of entries of the directory, translating each entry from the version used by the source module to the version used by the replication protocol and the version used by the destination module.

20. The storage medium of claim 18, the machine executable code further causes the machine to:
    evaluate each entry within the directory when the source module and the destination module use a different layout for storing the plurality of entries; and before replicating the plurality of entries of the directory, translating each entry from the version used by the source module to the version used by the replication protocol and the version used by the destination module.

21. The storage medium of claim 18, wherein the directory includes a file directory having a directory name and storing a unique file identifier for each file within the file directory.

22. The storage medium of claim 21, wherein the directory name and the unique file identifier define the version for the directory as used by the source module and the destination module.

23. The storage medium of claim 18, wherein the directory is replicated from a logical storage volume maintained by the source module to a logical storage volume maintained by the destination module.

24. The storage medium of claim 18, wherein the source module executes an operating system for maintaining the plurality of entries in the directory.

25. The storage medium of claim 18, wherein the destination module executes an operating system for maintaining the plurality of entries in the replicated directory.

26. A system, comprising:
    a memory having machine readable medium comprising machine executable code having instructions stored thereon; and a processor module coupled to the memory configured to execute the machine executable code to:
    exchange information via a replication protocol regarding a directory version of the directory between a source module and a destination module;
    determine that the source module and the destination module use a same layout in the directory for storing the plurality of entries, when the source module and the destination module use a same directory version for storing the plurality of entries; wherein the same layout is defined by an order in which each of the plurality of entries are stored by the source module and the destination module; and
    replicate the directory from the source module to the destination module without evaluating and translating the plurality of entries from a version used by the source module to a version used by replication protocol and a version used by the destination module, when the source module and the destination module use a same directory version and the same layout for storing the plurality of entries.

27. The system of claim 26, the machine executable code is further executed to:
    evaluate each entry within the directory when the source module and the destination module use a different directory version for storing information for the directory; and before replicating the plurality of entries of the directory, translating each entry from the version used by the source module to the version used by the replication protocol and the version used by the destination module.

28. The system of claim 26, the machine executable code is further executed to:
    evaluate each entry within the directory when the source module and the destination module use a different layout for storing the plurality of entries; and before replicating the plurality of entries of the directory, translating each entry from the version used by the source module to the version used by the replication protocol and the version used by the destination module.

29. The system of claim 26, wherein the directory includes a file directory having a directory name and storing a unique file identifier for each file within the file directory.

30. The system of claim 26, wherein the directory name and the unique file identifier define the version for the directory as used by the source module and the destination module.

31. The system of claim 26, wherein the directory is replicated from a logical storage volume maintained by the source module to a logical storage volume maintained by the destination module.

32. The system of claim 26, wherein the source module executes an operating system for maintaining the plurality of entries in the directory.

33. The system of claim 26, wherein the destination module executes an operating system for maintaining the plurality of entries in the replicated directory.

* * * * *